June 17, 1947.  C. S. ASH  2,422,462
DUAL WHEEL BRAKE
Filed Jan. 17, 1945   3 Sheets-Sheet 1

INVENTOR.
Charles S. Ash.
BY
Hobart N. Durham
Attorney.

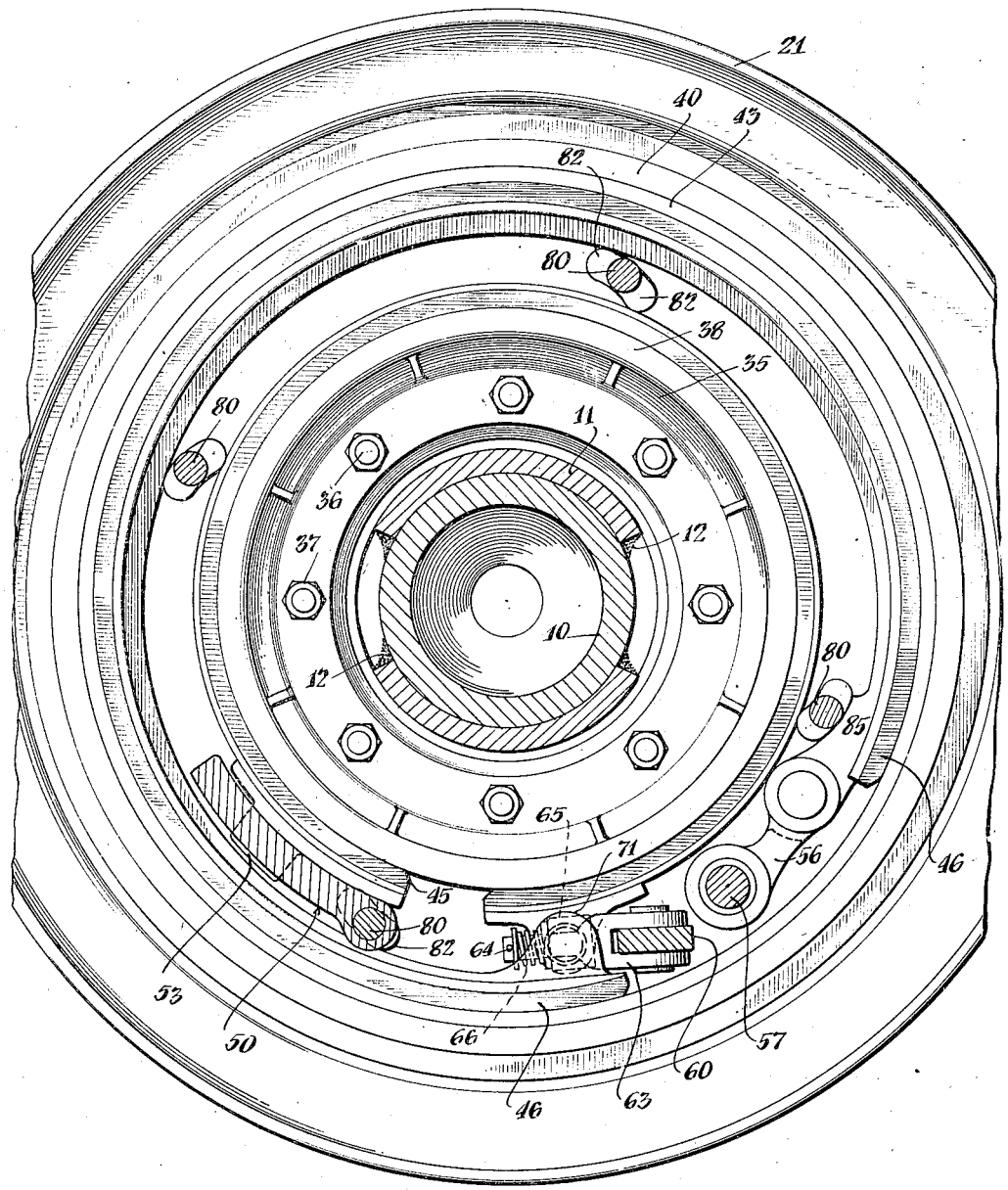

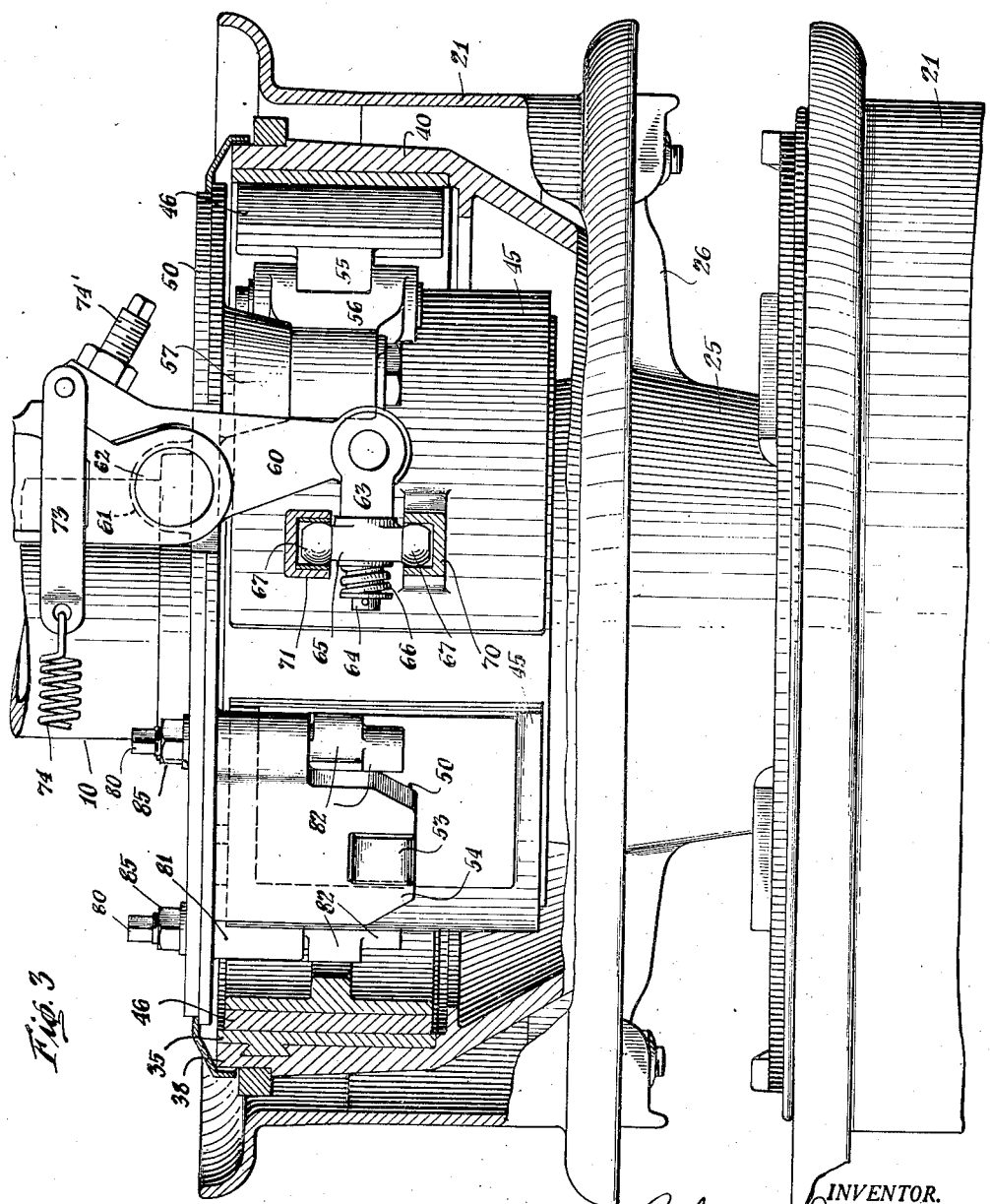

Patented June 17, 1947

2,422,462

UNITED STATES PATENT OFFICE 2,422,462

DUAL WHEEL BRAKE

Charles S. Ash, Milford, Mich.

Application January 17, 1945, Serial No. 573,226

4 Claims. (Cl. 188—18)

The present invention relates to vehicle brakes, and more particularly to brakes for dual wheel assemblies in which the individual wheels are independently rotatable.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

It is an object of the present invention to provide improved braking means for a vehicle dual wheel assembly in which the individual wheels of the assembly are capable of independent rotation.

Another object of the invention is the provision of braking means for such a wheel assembly as has been mentioned to furnish individual braking action to each wheel of the assembly. The invention further provides braking means for differential dual wheel assemblies which are balanced as to the individual wheels, that is, exerting substantially equal braking effort upon each wheel.

Still another object is the provision of brakes for differential dual wheel assemblies of relatively simple construction and design which afford substantially larger frictional areas and thus more efficient braking action than brakes heretofore used.

Of the drawings:

Fig. 2 is a cross-sectional view taken along line 2—2 of Fig. 1; and

Fig. 3 is a view partly in cross section and partly in bottom elevation of the braking means shown in Figs. 1 and 2.

Figure 1:
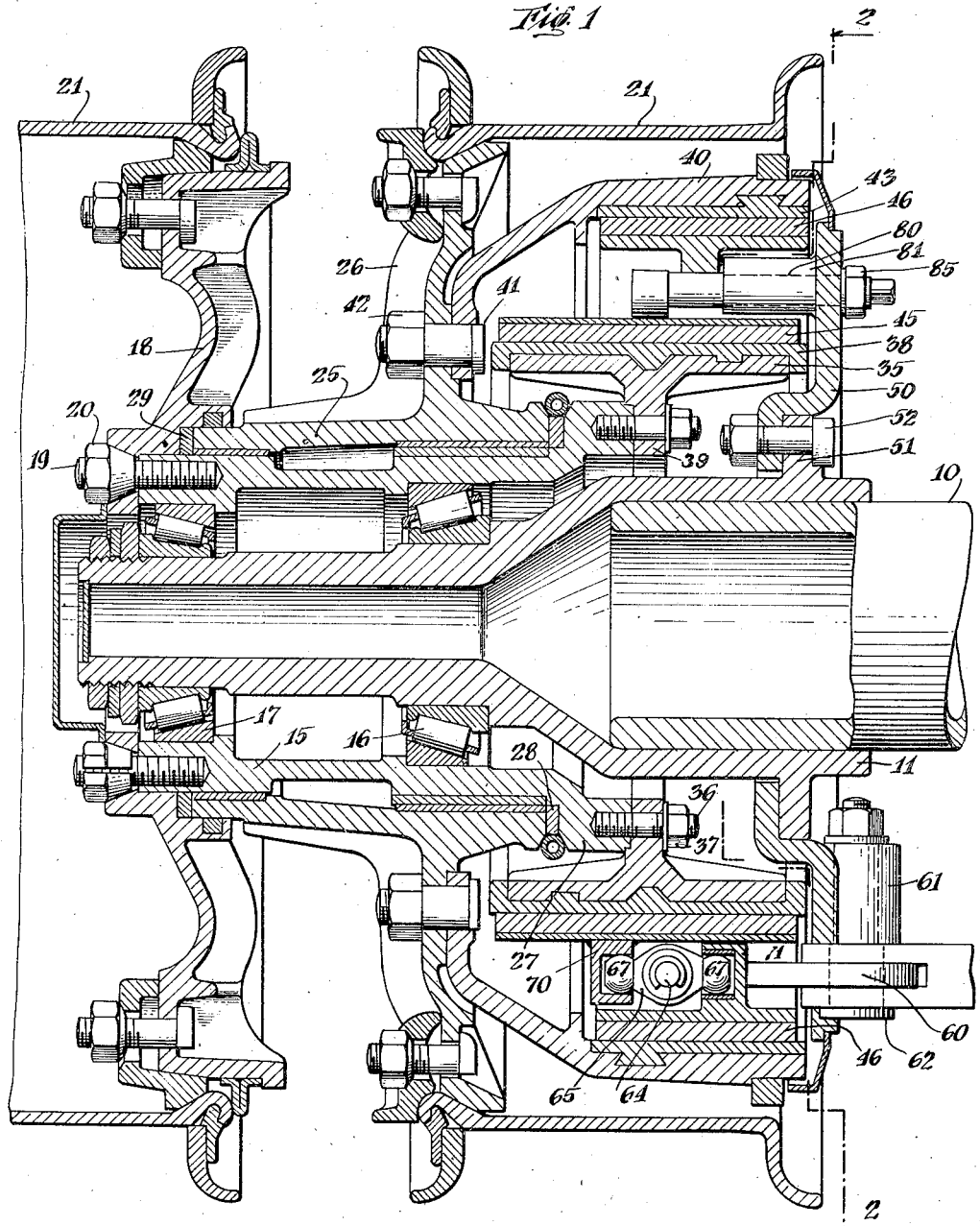
Fig. 1 is a vertical cross-sectional view of a differential dual wheel assembly having braking means in accordance with the present invention.

In accordance with a typical and illustrative embodiment of the present invention the braking means are associated with a dual wheel assembly in which the individual wheels are independently rotatable, one wheel having a cylindrical hub adapted to rotate on a vehicle axle end and the second wheel having a cylindrical hub journalled on the outer surface of the first hub and rotatable thereon. The braking means for the wheels comprise a pair of brake drums one held with respect to each wheel for correlative rotation therewith. The brake drums are positioned inwardly of the innermost wheel of the assembly in coaxial relation with each other and overlapping. Between the drums there is provided an individual brake shoe for each brake drum, one shoe for expansion into frictional contact with the radially outer drum and another for contraction about the radially inner drum, and actuating means common to the shoes are provided for applying the brakes. The radially inner cooperating brake drum and shoe are formed so as to be of substantially greater width than that of the radially outer cooperating brake drum and shoe, and the widths of the drums and shoes are preferably made such that the frictionally engaged surfaces of one drum and shoe set will be substantially equal to those of the other set.

It will be understood that the foregoing general description and the following detailed description as well are exemplary and explanatory of the invention but are not restrictive thereof.

Referring now in detail to the illustrative embodiment of the invention shown by way of example in the accompanying drawings, and referring first to Fig. 1, a dual wheel assembly is shown mounted on a tubular vehicle axle 10 having a tubular axle end 11 for carrying the wheel assembly. The axle end 11 may be pressed on axle 10 and then shrunk in place thereon and arc welded as at 12 in apertures which are provided on either side of the axle end for the purpose.

A substantially cylindrical axially extending hub 15 is freely rotatably mounted on axle end 11 by means of a pair of roller bearings 16 and 17 which are held in place by suitable washers and nuts on the end of member 11. The outer wheel web 18 is mounted on the end of hub 15 by means of bolts 19 and conical nuts 20, and on the web is demountably mounted a tire carrying rim 21 in any known and convenient manner.

A second cylindrical hub 25 is provided for the inner wheel of the assembly and, as shown in Fig. 1, this hub is of greater diameter than hub 15 and is journalled on the outer surface thereof for independent relative rotation. The inner wheel web 26 is formed integrally with its hub 25 and carries at its periphery a rim 21 which is a duplicate of the outer wheel rim but oppositely faced. The outer wheel hub 15 is provided at its inner end with an integral flange portion 27, and the inner wheel hub 25 is positioned between this flange and the outer wheel web 18 and annular thrust bearing rings 28 and 29 are located at either end of the hub.

The braking means for the outer wheel 18 of the assembly comprise a brake drum 35 secured by means of a central annular rib 39 to the flange 27 with a plurality of bolts 36 and nuts 37. Brake drum 35 as shown is designed to be constructed of aluminum or other light weight material, and has an outer shell 38 of cast iron or steel in order to furnish a strong and durable frictional surface member.

The inner wheel 26 of the dual wheel assembly has a brake drum 40 of somewhat flared or frusto-conical shape, secured at its outer, and smaller, end to the web of wheel 26 by means of a plurality of bolts 41 and nuts 42. Brake drum 40 is likewise designed to be made of light weight material such as aluminum and has an inner shell 43 of cast iron or steel as a friction surface member.

There are thus provided a pair of brake drums 35 and 40 mounted for correlative rotation with respect to the wheels 18 and 26 respectively, and it will be noted that the width of drum 35 is considerably greater than that of drum 40, while the radius of the latter drum is substantially greater than that of the former, the two being concentrically arranged and one overlapping the other. The widths and radii of the drums are preferably so chosen that the outer surface of member 38 and the inner surface of member 43 are substantially equal, so that balanced retarding action will be exerted upon wheels 18 and 26 when the brakes are actuated.

The brake shoes for the drums 35 and 40 are arranged between the two for frictional engagement therewith. As best shown in Fig. 2, the brake shoe for the outer wheel is indicated by the numeral 45 and is arranged to surround brake drum 35, is of substantially the same width as said drum, and is provided with frictional brake lining material on its inner surface to be contracted against the outer surface of member 38. The brake shoe 46 for the inner wheel 26 is arranged radially outwardly of shoe 45 and its outer surface is provided with frictional braking material for expansion outwardly into engagement with the inner surface of member 43. The width of the brake shoe 46 is substantially the same as that of shell member 43, which provides the frictional contact for the brake drum 40 for inner wheel 26.

The brake shoe anchoring means, as shown in Fig. 1, comprises the annular plate 50 which is secured adjacent its inner periphery to an integral flange portion 51 of axle end 11 by means of a plurality of bolts 52. As may be seen in Figs. 2 and 3, one end of brake shoe 45 has a radially outwardly extending lug 53 to engage an axially outwardly extending shoulder 54 of anchor plate 50 so that, with reference to Fig. 2, the movement of shoe 45 in a clockwise direction is limited. The anchoring means for the other brake shoe 46 comprise the elongated projection 55 at one end thereof pivotally connected to a yoked link member 56, which is pivotally connected at its other end to a boss 57 extending axially outwardly from the face of anchor plate 50.

Actuation of the brake shoes is accomplished by a lever arm 60 which is pivotally mounted on an integral boss 61 on anchor plate 50 by means of a bolt 62. The lever 60 extends into the space between brake shoes 45 and 46 and has at its end a pivotally mounted link 63 having a reduced shaft portion 64 on which is loosely fitted a cross member 65, the latter being biased in one direction by a coiled spring 66. The cross member 65 is provided with spherically shaped ends 67 which seat in box-like projections 70 and 71 on the adjacent ends of brake shoes 45 and 46 respectively. A retracting link 73 and spring 74 are provided the former being pivotally secured to lever 60, and an adjusting screw 74' is also provided through lever 60 to seat against some stationary part of the assembly and allow adjustment of the maximum retraction of lever 60.

The radial spaced relationship of the brake shoes 45 and 46 with respect to each other may be varied by means of a plurality of adjusting pins 80, four such pins being shown for the illustrative embodiment of the drawings. Pins 80 extend through anchor plate 50 and bosses 81 formed integrally therewith and carry at one end a pair of cams 82. Cams 82 are positioned to extend radially oppositely from pins 80 and are axially side by side therealong, so that as the pins are turned individual cams engage surfaces of respective areas of the brake shoes 45 and 46. The pins 80 may be locked with respect to anchor plate 50 by lock nuts 85, and they provide a means for accurately adjusting the distance of the brake shoes from their respective brake drums in brake-off position.

Referring particularly to Fig. 2, the brakes are actuated or engaged when lever 60 is moved by any suitable and known means to thrust link 63 in a clockwise direction. The ends of brake shoes 45 and 46 connected to link 63 through cross member 65 are thus moved in a clockwise direction and brake shoe 45 is contracted into frictional engagement with drum 35 while shoe 46 is expanded into frictional engagement with brake drum 40. Upon termination of braking pressure on lever 60 the shoes are retracted to brake-off position by action of retraction spring 74.

The invention in its broader aspects is not limited to the specific mechanisms shown and described but departures may be made therefrom within the scope of the accompanying claims without departing from the principles of the invention and without sacrificing its chief advantages.

What I claim is:

1. Braking means for a wheel assembly having a pair of independently rotatable wheels comprising, in combination, a cylindrical element secured to each wheel for rotation therewith said elements being arranged in coaxial overlapping relationship with each other, and means movable to frictionally engage cylindrical braking surfaces of said elements, said braking surfaces being of substantially equal area.

2. Braking means for a dual wheel assembly comprising, in combination a cylindrical element secured to each wheel for rotation therewith said elements being arranged in coaxial overlapping relationship with each other, and means movable to frictionally cylindrical braking surfaces of said elements, said braking surfaces being of substantially equal area.

3. Braking means for a wheel assembly having a pair of independently rotatable wheels comprising, in combination, a cylindrical element secured to each wheel for rotation therewith said elements being arranged in coaxial overlapping relationship with each other, and a pair of cylindrical brake shoes each movable to frictionally engage a cylindrical braking surface of a respective one of said elements, said cylindrical surface of the radially inner element and the shoe engageable therewith being of substantially greater axial widths than those of the said surface of the radially outer element and the shoe engageable therewith, an actuator for said shoes comprising a cross member parallel to the axis of the wheel and pivotally connected at either end to a brake shoe, said actuator being pivoted for movement substantially circumferentially of the brake elements.

4. Braking means for a wheel assembly having a pair of independently rotatable wheels comprising, in combination, a cylindrical drum secured to each wheel for rotation therewith said drums being arranged in coaxial overlapping relationship with each other, a pair of cylindrical brake shoes between said drums, anchoring means secured adjacent one end of each of said shoes limiting rotary movement in one direction and means connected to said shoes adjacent the other ends thereof for moving said last mentioned ends in said direction, an actuator for said shoes comprising a cross member parallel to the axis of the wheel and pivotally connected at either end to a brake shoe, said actuator being pivoted for movement substantially circumferentially of the brake elements.

CHARLES S. ASH.

REFERENCES CITED

The following references are of record in the file of this patent:

UNITED STATES PATENTS

| Number | Name | Date |
| --- | --- | --- |
| 1,735,206 | Madden | Nov. 12, 1929 |
| 2,284,357 | Ash | May 26, 1942 |
| 1,995,834 | Brush | Mar. 26, 1935 |